United States Patent Office

3,679,659
Patented July 25, 1972

3,679,659
PROCESS FOR THE PREPARATION OF SODIUM GLUCOHEPTONATE
Henry C. Zak, Great Notch, N.J., assignor to Belzak Corporation, Clifton, N.J.
No Drawing. Filed Dec. 18, 1969, Ser. No. 886,398
Int. Cl. C07c 47/18
U.S. Cl. 260—209 R    12 Claims

ABSTRACT OF THE DISCLOSURE

A soluble cyanide is reacted with dextrose hydrate or anhydrous dextrose, for example, in an aqueous solution having a total solids content of 50–65% by weight at 0°–40° C. while removing ammonia produced in the reaction by sparging or vacuum over a period of 4–12 hours, whereby a pure light colored alpha glucoheptonate salt crystallizes directly from solution in high yield. A second crop of crystalline alpha glucoheptonate salt is obtained by concentrating the mother liquor; the remaining mother liquor being a desirably light colored solution in the beta isomer. Glucoheptonic acid and its lactone are obtained from the salts. The process is also operable with other 6-carbon atom aldo- and keto-sugars; e.g. with invert sugar to produce alpha and beta glucoheptonate and alpha and beta fructoheptonate. The process provides solutions of glucoheptonates capable of being spray dried according to conventional techniques to provide dry, crystalline glucoheptonates.

BACKGROUND OF THE INVENTION

The value of the sugar acids and their soluble salts and lactones as sequestering or chelating agents for metal ions, particularly in alkaline solution, has been recognized for many years and these materials have been used industrially in alkaline de-rusting processes, bottle washing, descaling, for the prevention of iron-staining in paper making, and in the processing of cotton and other textiles, among numerous other applications which could be mentioned. The soluble gluconates, and particularly sodium gluconate, have come into most widespread use for these purposes, primarily because of their availability and relatively low cost. It has long been recognized, however, that the soluble salts of glucoheptonic acid, the acid itself, and its lactone, are superior to the corresponding gluconate materials in solubility and stability in the strongly alkaline solutions in which these materials are generally employed.

While Kiliani prepared sodium glucoheptonate as early as 1886 by the reaction of hydrocyanic acid with glucose in aqueous solution and many modified methods for the preparation of the valuable salt have been suggested since then, even the superior dry crystalline glucoheptonates have not been able to displace the gluconates in industrial applications due to the fact that they have been not only substantially more expensive but have also previously suffered from the serious disadvantage of being available only in highly colored amber to red or red-brown solutions. Such highly colored sequestering agents are unsuitable in many applications in the paper, textile and pharmaceutical industries. The yields of dry crystalline glucoheptonates obtained by processes of the prior art have also been relatively low except when expensive separation techniques employing water immiscible solvents have been employed, thus accounting for the relatively high cost of these materials.

It is a primary object of the present invention, therefore, to provide an improved process for the production of dry crystalline soluble salts of glucoheptonic acid at costs competitive with those of the corresponding gluconate materials.

It is another object of the invention to provide a method for obtaining glucoheptonates of very light color as compared with the amber to red or red-brown materials previously available.

It is still another object of the invention to obtain relatively high yields of the crystalline alpha isomer of the glucoheptonates as compared to the non-crystalline beta isomer of these materials.

It is a further important object of the invention to obtain the desired pure, light colored crystalline alpha glucoheptonate dihydrate salts by direct crystallization from the reaction mixture in which they are formed, in relatively short periods of time of about 4 to 12 hours, without the addition of water immiscible solvents and in yields of 56% or more, thus reducing the cost of such materials.

It is still another object of the invention to produce alpha and beta glucoheptonates and alpha and beta fructoheptonates from invert sugar.

It is another primary object of the invention to provide glucoheptonate solutions capable of being spray dried according to conventional techniques to produce dry, glucoheptonate powder.

SUMMARY OF THE INVENTION

The above and other objects of the present invention to be described hereinafter are obtained by reacting approximately equal molar quantities of a soluble cyanide salt, such as sodium cyanide, with dextrose, either anhydrous or the hydrate, in an aqueous solution containing about 50 to 65% by weight of the reactants at a temperature in the range of about 0° to 40° C., while removing ammonia formed in the reaction over a period of about 4 to 12 hours. The ammonia is removed either by sparging the reaction mixture with an inert gas or by partial evacuation of the free space above the reaction mixture in the reaction vessel. A vacuum equivalent to the pressure of about 20 to 60 mm. of Hg and preferably not over 35 mm., being suitable for this purpose. This critical combination of reaction conditions ensures that the desired, pure, light colored alpha glucoheptonate dihydrate salt will crystallize directly from the reaction mixture in yields of about 65% of theory or greater. A second crop of crystals of the alpha isomer may be obtained from the mother liquor by conventional techniques to raise the overall yield of the alpha isomer to 72 to 75% or more of theory. The remaining mother liquor, containing the beta isomer, even when concentrated to contain the equivalent of about 60 to 70% solids, is a light straw color, suitable for industrial applications for which the dark amber to red or red-brown solutions previously available are unsuitable.

It is most important that the concentration of solids initially present in the reaction mixture be at least about 50% by weight of the solution and preferably about 57%, since with the dilute reaction mixtures of the prior art the resulting product becomes highly colored. It is also important that the ammonia formed in the reaction be removed as efficiently as possible during the time the reaction is proceeding, since if the ammonia is removed only after completion of the reaction, the resulting product will again be the dark colored product previously obtained. It is also important that the reaction be completed in as short a time as possible, i.e. within about 4 to 12 hours, and preferably not over 8 hours, as opposed to the practice of the prior art in which the reaction mixture was permitted to age for periods on the order of three days before attempting to recover crystalline glucoheptonate from the solution. The reaction temperature should also be kept as low as possible within the 0 to 40° C. range, preferably below 25° C., and most preferably about 0 to 10° C., in order to minimize the formation of color bodies in the product and to produce alpha isomer in predominance.

Any suitable soluble cyanide salt can be employed in the present invention, the sodium, potassium, calcium and barium salts being preferred, and the sodium salt being especially preferred due to its availability and relatively low cost.

While it will be apparent to those skilled in the art that any 6-carbon atom keto- or aldo-sugar can be employed, for example hydrolyzed sucrose providing fructose and dextrose, it is preferred to employ dextrose, either dextrose hydrate or anhydrous dextrose (glucose).

Any inert gas such as air or nitrogen may be used to sparge the reaction mixture in order to remove the ammonia as it is formed, if desired, instead of an evacuating device such as a conventional water aspirator.

The glucoheptonate solutions produced according to the present invention, unlike similar solutions of the prior art, have the unique ability to be spray dried according to conventional techniques to produce a dry, glucoheptonate powder.

This unique capability is believed to be due to the fact that the glucoheptonate content of solutions obtained according to the present invention is present primarily in the alpha rather than the beta form, i.e. 60 to 100% alpha glucoheptonate and not more than about 40% beta glucoheptonate.

Having now described the invention in general terms, it will be illustrated in greater detail in the following specific examples which are illustrative only and are not to be construed as limiting the foregoing description.

EXAMPLE I 98 g. of sodium cyanide (2 moles), 190 g. of water and 140 g. of ice were charged into a 1 liter flask fitted with stirrer and thermometer, and connected to a water jet vacuum device (aspirator). 396 g. of dextrose hydrate (2 moles) were than charged into the flask causing the temperature to rise to 8° C. The aspirator was turned on. When the temperature of the reaction mixture reached 23° C., the solution became completely clear. Very fine bubbles of ammonia gas appeared to be forming. When the temperature of the solution reached approximately 27° C., the ammonia started to boil vigorously. Within approximately 1 hour, crystallization of alpha sodium glucoheptonate dihydrate began.

The boiling off of ammonia was continued for approximately 7 more hours at which time the crystals produced were removed by filtration on a Büchner funnel. A first crop of 385 g. of crystalline dry alpha sodium glucoheptonate dihydrate was obtained amounting to about 68% of the theoretical yield.

EXAMPLE II 98 g. (2 moles) of sodium cyanide and 300 g. of water were charged into a flask fitted with a stirrer, thermometer and a connection to a water jet aspirator. The contents of the flask were cooled to 2° C. by means of an ice bath. 396 g. (2 moles) of dextrose hydrate were charged into the flask over a period of about 30 minutes. When the sugar had all been charged, the temperature rose to 8° C. at which time the vacuum jet was turned on to provide a vacuum of about 40 mm. of Hg. Within about 30 minutes the temperature rose to 27° C. at which time the ammonia began to boil off vigorously. Within approximately 1 hour, the alpha sodium glucoheptonate dihydrate began to crystallize. The removal of the ammonia was continued at 27° C.–32° C. and at a vacuum of 33–40 mm. of Hg for 6 hours. The crystals were filtered, water washed and air dried. The first crop yield of alpha sodium glucoheptonate was 328 grams or 57.7% of theoretical. The calcium chelation value was found to be 548 mgs. $CaCO_3$/g. of product utilizing method of Mehltretter et al., Ind. Engr. Chem. vol. 45, No. 12, pp. 2782–2784.

EXAMPLE III

The procedure of Example II was repeated. 1044 g. of the combined mother liquors of Example II and this example were evaporated at 32° C.–40° C. and at 35–40 mm. of vacuum to a concentration of approximately 75% solids. A second crop of alpha sodium glucoheptonate thus produced was filtered and air dried. The yield was 172 g. The combine average yield of alpha sodium glucoheptonate dihydrate of Examples II and III in two crops was found to be 72% of theoretical. The residual mother liquor containing beta sodium glucoheptonate, when adjusted to a 50% solids, was straw colored.

EXAMPLE IV

Spray dried sodium glucoheptonate

The object of this example is to demonstrate that by using the unique process of the present invention, a free flowing, high quality spray-dried sodium glucoheptonate may be obtained.

A larger batch was made as described in Example II. An aliquot sample was diluted to 50% solids slurry and fed thru a Bowen Pilot spray dryer having an air inlet temperature of 400° F. and an air outlet temperature of 130° F. with a 2″ CSE atomizer rotating at 48,000 r.p.m. Total solids fed were 891 grams, total solids collected were 846 grams or a recovery of 95% of a free flowing tan powder having a calcium chelation value of 606 mgs. $CaCO_3$/g. and an iron chelation value of 3,500 mgs. $Fe^{+++}$/g. in a 3% NaOH solution by the method described by Mehltretter et al., referred to above in Example II.

While the spray drying conditions set forth above are illustrative, it will be appreciated that other conditions may operate satisfactorily depending upon the size and design of the particular spray dryer employed. Conventional spray drying techniques and conditions are operable to produce a dry glucoheptonate product from the solutions obtained by the present invention, whereas it has heretofore not been possible to obtain satisfactory products by spray drying solutions obtained according to the methods of the prior art.

EXAMPLE V

The procedure of Example I was repeated except that liquid HCN was substituted for the sodium cyanide and an equal molar amount of NaOH was added to the solution at 0° to 10° C. The reaction was carried out as before at a temperature of 0 to 40° C. with removal of the ammonia and crystallization of resulting glucoheptonate.

Similar results may be obtained by substituting invert sugar for the dextrose hydrate of the above examples, or any other 6-carbon atom keto- or aldo-sugar.

Similar results can be obtained by following the procedure of Example I, substituting calcium, barium or potassium cyanide or any other soluble cyanide salt for the sodium cyanide. The reaction may also be carried out in an open reaction vessel under an exhaust hood, removing the ammonia as it is formed by bubbling nitrogen or air into the liquid reaction mixture. Any suitable cooling means may be employed to keep the exothermic reaction from heating the reaction mixture above 40° C. or preferably to maintain the reaction temperature below 25° C. and most preferably in the range of 0 to 10° C.

After spontaneous separation of the initial crop of crystals of alpha glucoheptonate from the reaction mixture, the remaining mother liquor may be concentrated further by conventional techniques such as vacuum distillation in order to keep the temperature low, i.e. below 40° C. and a second crop of crystals recovered. The remaining mother liquor containing the non-crystallizable beta isomer, can be used as is or concentrated further as desired. In any case, however, this mother liquor will be a light straw color rather than the dark red-brown color of the prior art product.

The glucoheptonic acid and its lactone may be obtained from either the pure alpha crystals or the beta isomer solution. The preferred method for obtaining the lactone is to permit it to crystallize from a solution of alpha glucoheptonic acid. The preferred method for obtaining the acid is by cation exchange according to conventional techniques.

While the invention has been described in conjunction with certain specific examples and reactants, it is to be understood that these are merely illustrative and are not to be construed as limiting, since wide variation is possible wihin the critical combination of conditions set forth above.

What is claimed is:

1. In a method for the preparation of a glucoheptonate comprising reacting a soluble cyanide with a sugar selected from the group consisting of 6-carbon atom keto-sugars and aldo-sugars, in approximately stoichiometric proportions in aqueous solution, the improvement which comprises: conducting said reaction with the total content of said cyanide and sugar in the range of 50 to 65% of the reaction mixture at a temperature in the range of 0 to 40° C., for a period of 4 to 12 hours, while removing ammonia from the reaction mixture as it is formed therein, whereby light colored alpha glucoheptonate dihydrate crystallizes directly in the reaction mixture.

2. A method according to claim 1, wherein the sugar is dextrose.

3. A method according to claim 1, wherein the sugar is an invert sugar.

4. A method according to claim 1, wherein the sugar is fructose.

5. A method according to claim 2, wherein the soluble cyanide salt is sodium cyanide.

6. A method according to claim 2, wherein the ammonia is removed by evacuation of the atmosphere above the reaction mixture.

7. A method according to claim 6, wherein the reaction temperature is maintained below 25° C.

8. A method according to claim 7, wherein the reaction temperature is maintained in the range from 0 to 10° C.

9. A method according to claim 2, wherein the ammonia is removed by bubbling an inert gas through the reaction mixture.

10. A method according to claim 1, wherein the cyanide is HCN, the sugar is dextrose and the molar equivalent of NaOH to said HCN is added to the solution at 0 to 10° C.

11. In a method for the preparation of a glucoheptonate comprising reacting a soluble cyanide with a sugar selected from the group consisting of 6-carbon atom keto-sugars and aldo-sugars in approximately stoichiometric proportions in aqueous solution, the improvement which comprises: conducting said reaction with the total content of said cyanide and sugar in the range of 50 to 65% of the reaction mixture; at a temperature in the range of 0 to 40° C., for a period of 4 to 12 hours, while removing ammonia from the reaction mixture as it is formed therein, whereby a solution of glucoheptonate is formed, the glucoheptonate content of which is at least about 60% in the alpha form, and spray drying said solution to obtain a dry, crystalline glucoheptonate.

12. In a method for the preparation of glucoheptonate-lactone comprising reacting a soluble cyanide with a sugar selected from the group consisting of 6-carbon atom keto-sugars and aldo-sugars in approximately stoichiometric proportions in aqueous solution, the improvement which comprises: conducting said reaction with the total content of said cyanide and sugar in the range of 50 to 65% of the reaction mixture; at a temperature in the range of 0 to 40° C., for a period of 4 to 12 hours, while removing ammonia from the reaction mixture as it is formed therein, whereby a solution of glucoheptonate is formed, converting said glucoheptonate to glucoheptonic acid and crystallizing the lactone from said solution.

References Cited
UNITED STATES PATENTS

| | | | |
|---|---|---|---|
| 1,057,437 | 4/1913 | Liebrecht et al. | 260—209 R |
| 2,853,495 | 9/1958 | Ruskin et al. | 260—209 R |
| 3,539,463 | 11/1970 | Harper et al. | 260—209 R |

OTHER REFERENCES

Pigman: "The Carbohydrates," 1957, Academic Press, Inc., New York, N.Y., pp. 106–108.

LEWIS GOTTS, Primary Examiner

J. R. BROWN, Assistant Examiner